(12) United States Patent
Bartel et al.

(10) Patent No.: US 10,640,030 B2
(45) Date of Patent: May 5, 2020

(54) TRANSLATING CARGO ASSEMBLY

(71) Applicant: Excel Industries, Inc., Hesston, KS (US)

(72) Inventors: Harlan John Bartel, Newton, KS (US); Royce A. Steinert, Hutchinson, KS (US); Brian R. Funk, Goessel, KS (US); David L. Marshall, Park City, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 89 days.

(21) Appl. No.: 15/675,489

(22) Filed: Aug. 11, 2017

(65) Prior Publication Data

US 2018/0043812 A1 Feb. 15, 2018

Related U.S. Application Data

(60) Provisional application No. 62/373,843, filed on Aug. 11, 2016.

(51) Int. Cl.
*B60P 1/34* (2006.01)
*B60P 1/28* (2006.01)
*B60P 1/06* (2006.01)

(52) U.S. Cl.
CPC .................... *B60P 1/34* (2013.01); *B60P 1/06* (2013.01); *B60P 1/28* (2013.01)

(58) Field of Classification Search
CPC ............ B60P 1/34; B60P 1/483; B60P 1/165; B60P 1/283; B60P 1/64; B60P 1/12; B60P 1/16; B60P 1/30; B60P 1/28; B60P 1/6454

USPC ..... 298/11, 18, 17.5, 10, 14, 22 P, 5, 24, 12, 298/17.7, 13; 296/146.8, 75, 64, 56, 296/190.1, 190.11, 183.2
See application file for complete search history.

(56) References Cited

U.S. PATENT DOCUMENTS

| 1,650,815 | A | * | 11/1927 | Barrett | ...................... | B60P 1/34 |
| | | | | | | 298/11 |
| 5,350,210 | A | * | 9/1994 | Barnett | ................... | B66C 1/663 |
| | | | | | | 294/81.1 |
| 5,918,451 | A | * | 7/1999 | Vonesch | ............. | A01D 78/1007 |
| | | | | | | 56/365 |
| 8,157,316 | B1 | * | 4/2012 | Bartel | .................... | B62D 33/02 |
| | | | | | | 296/183.2 |
| 8,534,981 | B1 | * | 9/2013 | Bortz | ...................... | B60P 1/486 |
| | | | | | | 414/462 |
| 2003/0073400 | A1 | * | 4/2003 | Dahl | .................. | B60H 1/00378 |
| | | | | | | 454/139 |

(Continued)

*Primary Examiner* — D Glenn Dayoan
*Assistant Examiner* — Sunsurraye Westbrook
(74) *Attorney, Agent, or Firm* — Schook, Hardy & Bacon, LLP

(57) ABSTRACT

Aspects hereof relate to a translating cargo assembly for a vehicle. The translating cargo assembly may include a translation mechanism, which may be affixed to a cargo frame of the vehicle. The translating cargo assembly may also include a carrier frame that is coupled with the translation mechanism and configured to mate with cargo implements. A drive mechanism, such as a rotary actuator, may be coupled with the translation mechanism. The rotary actuator may be effective to translate the carrier frame through a range of positions including a transport position, in which the carrier frame may be adjacent to the cargo frame, and a loading position, in which the carrier frame may be proximate ground level.

19 Claims, 14 Drawing Sheets

(56) References Cited

U.S. PATENT DOCUMENTS

2007/0212205 A1\* 9/2007 Lowecki .............. B60P 1/6463
  414/498
2008/0112786 A1\* 5/2008 Deist .................... B60P 1/6463
  414/498

\* cited by examiner

TRANSLATING CARGO ASSEMBLY

CROSS-REFERENCE TO RELATED APPLICATIONS

This application claims the benefit of U.S. Provisional App. No. 62/373,843, filed Aug. 11, 2016 and entitled "Rotary-Actuated Translating Cargo Bed." The entirety of the aforementioned application is incorporated by reference herein.

SUMMARY

Aspects hereof relate to a translating cargo assembly, which may be coupled with or affixed to a cargo frame. For example, the translating cargo assembly may be coupled with or affixed to a cargo frame of a vehicle or a trailer. The translating cargo assembly may include a translation mechanism, a drive mechanism, such as a rotary actuator, and a carrier frame that is configured to mate with cargo implements, such as a cargo bed. The translation mechanism may be effective to translate the cargo assembly through a range of positions including a transport position, in which the cargo assembly may be adjacent to the cargo frame, and a loading position, in which the cargo assembly may be adjacent to the ground.

The translation mechanism may comprise a linkage, which may include one or more fixed pivots and one or more moving pivots. As the cargo assembly is moved between positions, the fixed pivots remain stationary relative to the cargo frame, and parallel one another. The moving pivots move relative to the cargo frame during translation. However, the moving pivots remain parallel and maintain a constant spacing relative to one another during translation. This allows the translation mechanism to smoothly rotate throughout the entire range of motion between the transport position and the loading position. In one aspect, the translation mechanism may comprise a first pivot link and a second pivot link that form a parallel linkage.

Additionally, when the cargo assembly is in the transport position, the translation mechanism and carrier frame may be substantially parallel to a horizontal plane defined by an uppermost portion of the cargo frame. Further, the drive mechanism may be positioned such that no specialized configuration of the cargo frame is required to accommodate the cargo assembly. Accordingly, the entire cargo assembly may be included with, or added to, a vehicle or a trailer without requiring redesign of the cargo frame. For example, in a vehicle such as a utility task vehicle ("UTV"), an engine and exhaust system, a rear axle and drive components, among many other types of components, may be positioned between members of the cargo frame. Continuing with this example, configuring the translating cargo assembly as described herein allows for the translating cargo assembly to be mounted to a cargo frame without requiring the specific configuration of other components to accommodate the cargo assembly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different components or combinations of components similar to the ones described in this document, in conjunction with other present or future technologies.

Figure 1:
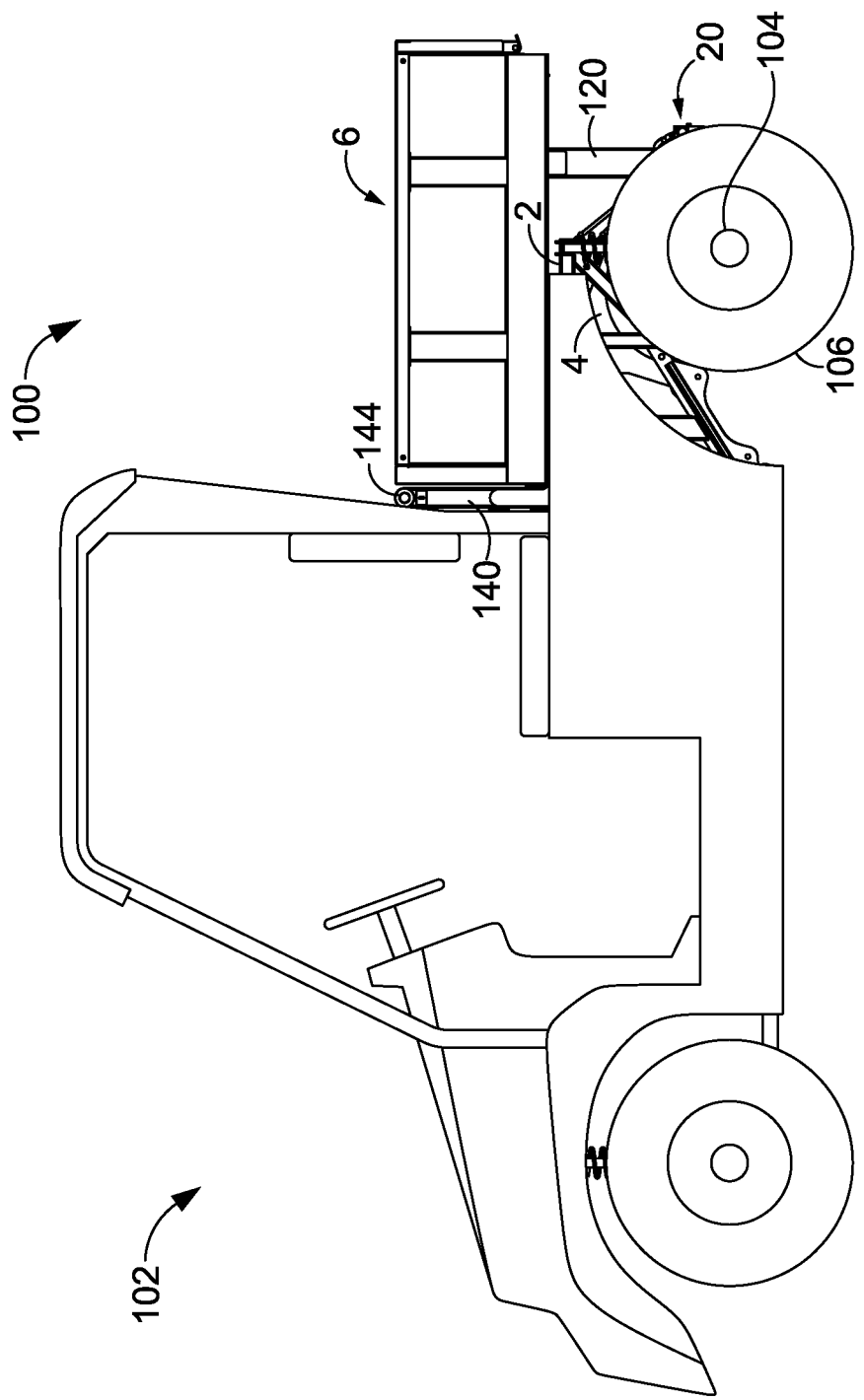
FIG. 1 depicts an exemplary utility vehicle having a translating cargo assembly affixed to a frame of the vehicle with the cargo assembly in a transport position.
Figure 2:
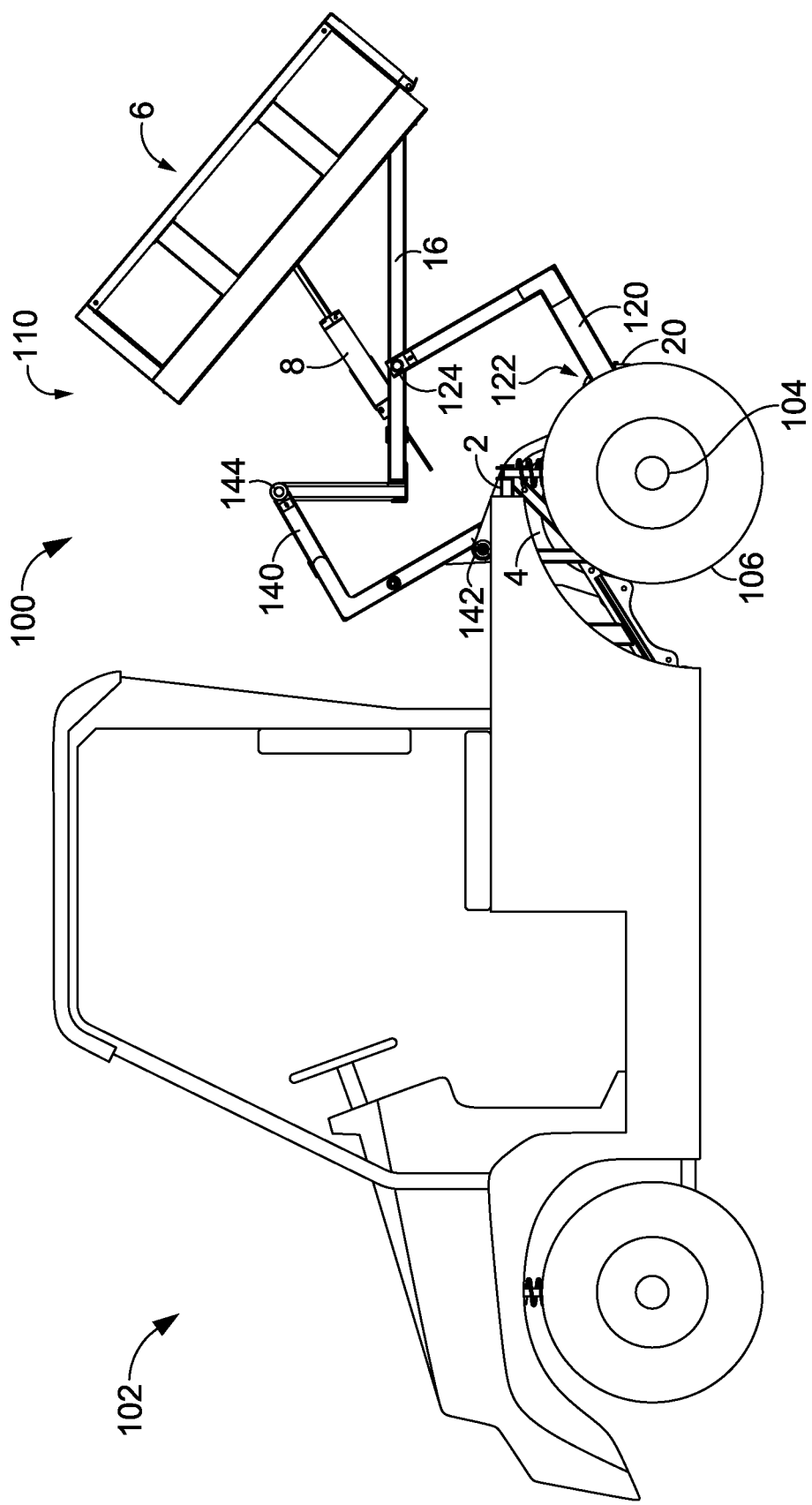
FIG. 2 depicts an exemplary utility vehicle having a translating cargo assembly affixed to a frame of the vehicle with the cargo assembly in an intermediate position.
Figure 3:
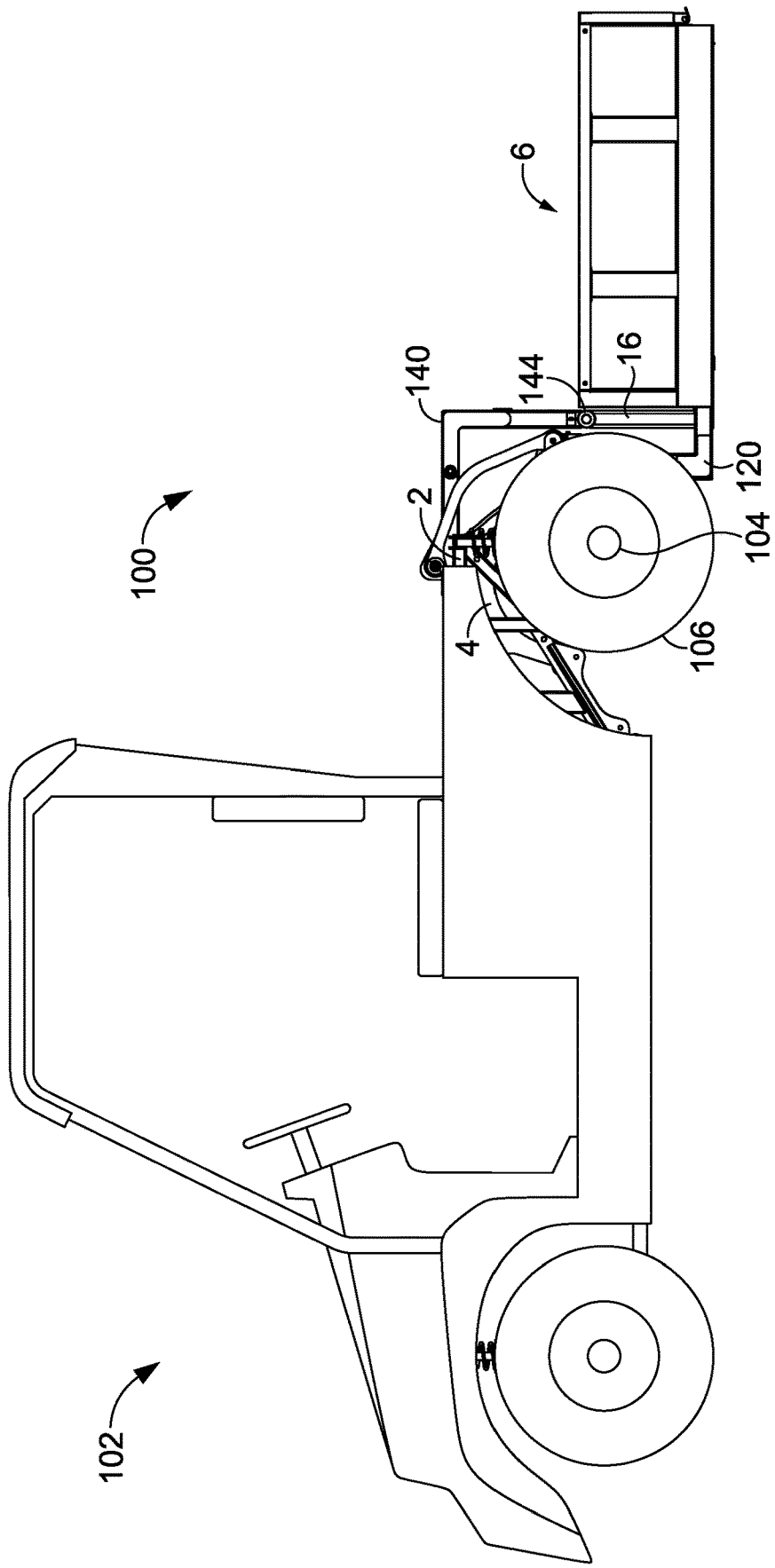
FIG. 3 depicts an exemplary utility vehicle having a translating cargo assembly affixed to a frame of the vehicle with the cargo assembly in a loading position.

FIGS. 1-3 depict a utility task vehicle 102 (UTV) having a rear axle 104 and a translating cargo assembly 100 affixed to a cargo frame 2 of the vehicle. The rear axle 104 may be positioned in the UTV 102 between an interior side of a left-rear tire 106 and an interior side of a right-rear tire (not shown). The cargo assembly is shown here as having a cargo bed 6 mated with a carrier frame 16 of the translating cargo assembly 100. However, as will be described in more detail below, it should be appreciated that any number of cargo implements may be utilized with the translating cargo assembly 100 described herein. FIG. 1 depicts the cargo assembly in a transport position. In the transport position, the translating cargo assembly 100 may be configured such that the translating cargo assembly 100 is substantially flat against the cargo frame 2. FIG. 2 depicts the translating cargo assembly 100 and an intermediate position. The translating cargo assembly 100 may include a mount 4 (as depicted FIGS. 4-6), which is affixed to or integrated with the cargo frame 2, a drive mechanism 20, which is coupled to the mount 4, a translating mechanism 110 that is rotatably coupled to the mount 4, and operatively coupled to the drive mechanism 20, and a cargo bed 6 that is rotatably coupled to the translating mechanism 110. It should be appreciated that the mount 4 may be integrated with the cargo frame 2. Further, it should be understood that the translating cargo assembly 100 may be directly coupled with or integrated with the cargo frame 2, in accordance with aspects of this invention.

The translating mechanism 110 may comprise a first pivot link 120 having a first pivot link first end 122 and a first pivot link second end 124. The translating mechanism 110 may also comprise a second pivot link 140 having a second pivot link first end 142 and a second pivot link second end 144. In this aspect, the first pivot link first end 122 is drivingly coupled with the drive mechanism 20 and the second pivot link first end 142 is coupled with the mount 4 (as shown in FIG. 4).

FIG. 3 depicts the translating cargo assembly 100 in a loading position. As shown here, the translating cargo assembly 100 is rotated to a position proximate ground-level to allow for easier access to the cargo implement, in this case, the cargo bed 6. Although depicted here as having rotated approximately 180° from the position depicted in FIG. 1, it should be appreciated that the cargo assembly may have a range of motion greater than 180°. For example, the cargo assembly may be configured to rotate the carrier frame 16 to a position beyond ground level. For instance, in the illustrative aspect depicted in FIG. 1-3, the carrier frame 16 may be translated to a position below the rear tires of the vehicle. This provides access to the cargo implement at a position that may be lower than the position of the vehicle.

Figure 4:
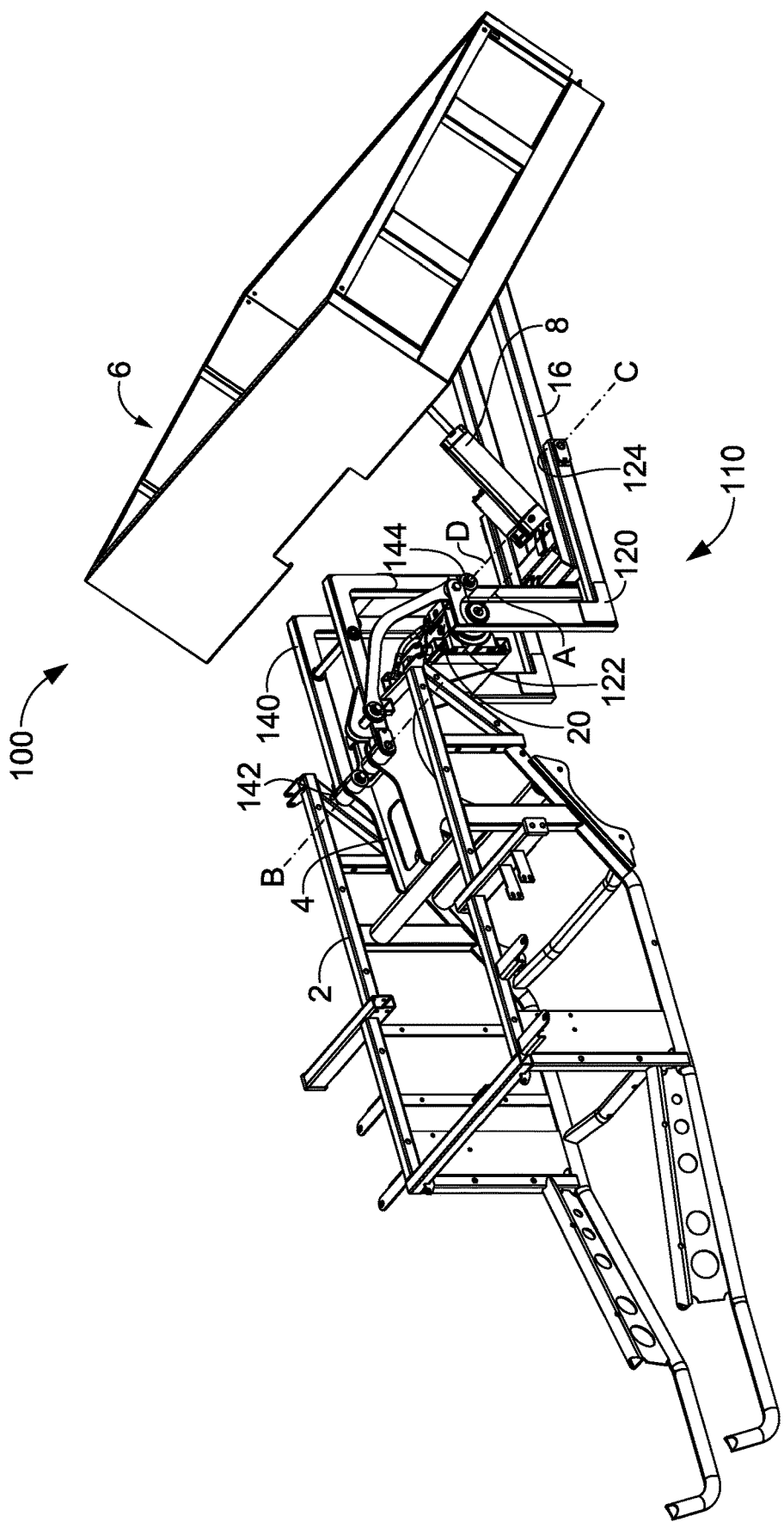
FIG. 4 depicts a utility vehicle frame having a translating cargo assembly affixed to the frame and in a loading position, with a cargo bed raised, from a front-left, top-down perspective view, in accordance with aspects hereof.

FIG. 4 depicts an aspect of a translating cargo assembly 100 coupled with a cargo frame 2. In this aspect, the cargo frame 2 depicted is of a UTV. However, as will be described in more detail below, the translating cargo assembly 100 may be implemented with any number of cargo frames. Additionally, in this aspect, a cargo bed 6 is depicted as a cargo implement, although it should be appreciated that any number of implements may be coupled with the carrier frame 16. The cargo bed 6 is shown here in in a dumping position, in order to provide a view of the other components of the translating cargo assembly 100.

The translating cargo assembly 100 may include a mount 4, which is affixed to or integrated with a cargo frame 2, a drive mechanism 20, which is coupled to the mount 4, a translating mechanism 110 that is rotatably coupled to the mount 4, and operatively coupled to the drive mechanism 20, and a cargo bed 6 that is rotatably coupled to the translating mechanism 110. It should be appreciated that the mount 4 may be integrated with the cargo frame 2. Further, it should be understood that the translating cargo assembly 100 may be directly coupled with or integrated with the cargo frame 2, in accordance with aspects of this invention.

The translating mechanism 110 may comprise a first pivot link 120 having a first pivot link first end 122, and a first pivot link second end 124. The translating mechanism 110 may also comprise a second pivot link 140 having a second pivot link first end 142 and a second pivot link second end 144. In this exemplary aspect, the first pivot link first end 122 is drivingly coupled with the drive mechanism 20 and the second pivot link first end 142 is coupled with the mount 4. As the drive mechanism 20 rotates the first pivot link 120 about axis A, and the second pivot link 140 is simultaneously rotated about axis B. Axes A and B are generally horizontal, transverse, parallel to each other, and spaced away from each other in longitudinal and vertical directions.

Figure 8:
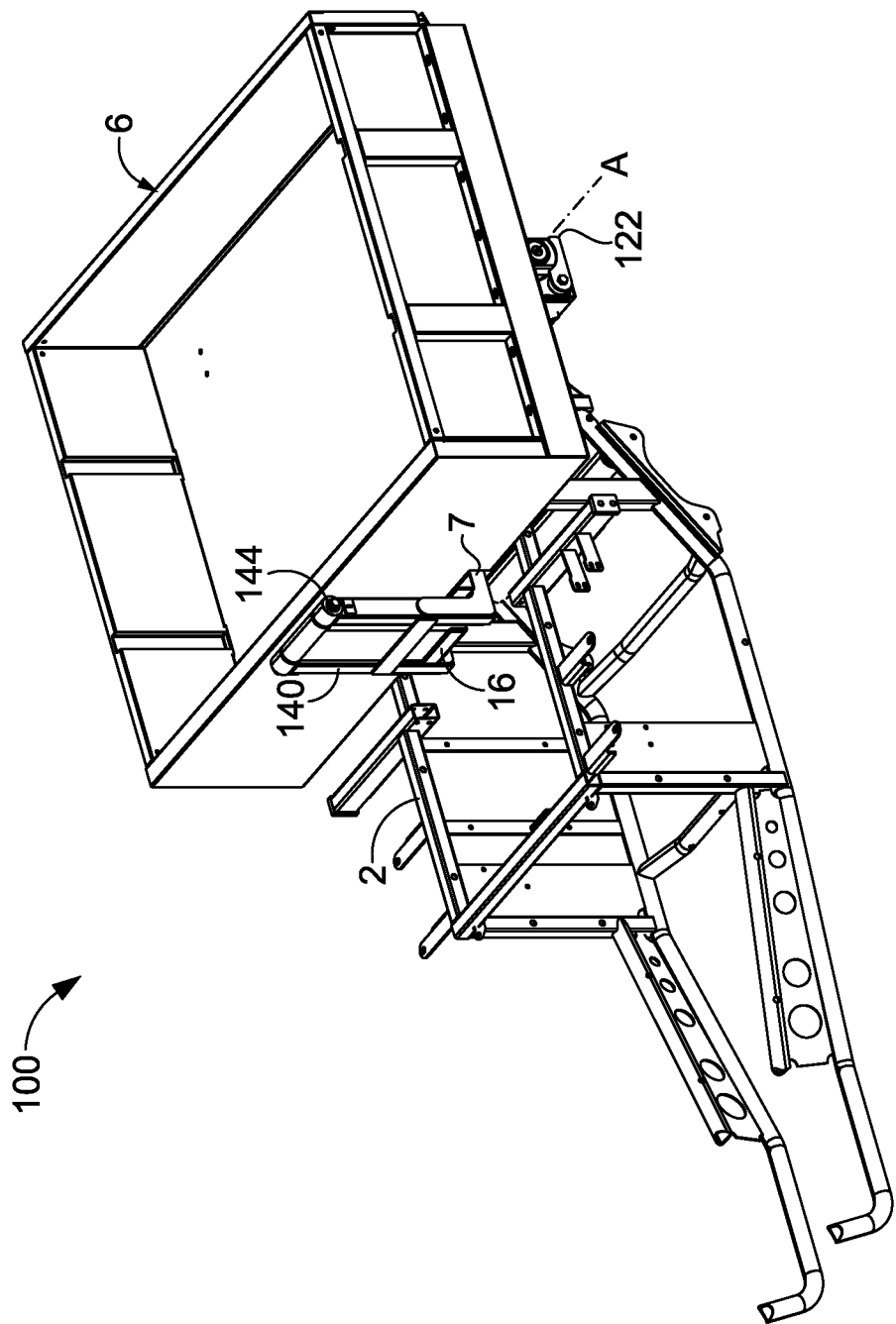
FIG. 8 depicts the utility vehicle frame having the translating cargo assembly affixed to the frame and in a transport position, in accordance with aspects hereof.

The first pivot link second end 124 may be pivotably coupled with the carrier frame 16, for example, at axis C. The second pivot link second end 144 may also be coupled with the carrier frame 16, for example, at axis D. Axes C and D are also generally horizontal and transverse, parallel to each other and spaced away from each other in the longitudinal and vertical directions. Accordingly, axes A and B remain parallel to one another, and axes C and D remain parallel to one another during translation of the cargo assembly between the loading position and a transport position (as shown in FIG. 8).

In another aspect, the cargo bed 6 may be pivotably mounted to the carrier frame 16. The cargo bed 6 may be pivotably mounted to the carrier frame 16 proximate a rear end of the cargo bed 6. A dump mechanism 8 may be mounted between the carrier frame 16 and the cargo bed 6. The dump mechanism 8 may be operable for rotating the cargo bed 6 from a level cargo hauling position to a tilted dumping position in order to dump the contents of the cargo bed 6.

Figure 5:
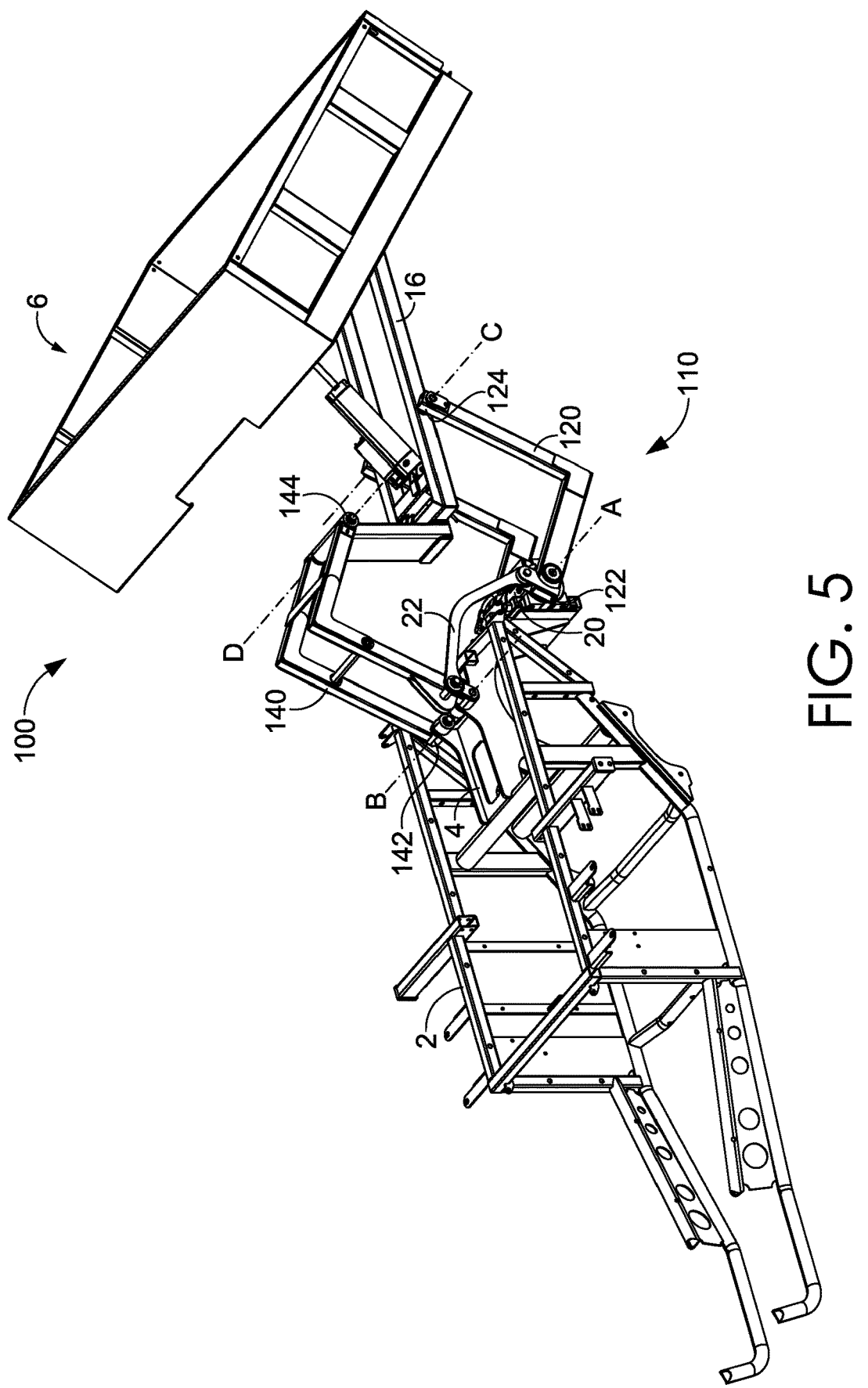
FIG. 5 depicts the utility vehicle frame having the translating cargo assembly affixed to the frame and in a first intermediate position, in accordance with aspects hereof.

FIG. 5 depicts the cargo frame 2 having the translating cargo assembly 100 affixed to the cargo frame 2 and in a first intermediate position. The first intermediate position represents a position of the translating cargo assembly 100 as the assembly is rotated from the loading position depicted in FIG. 1 toward the transport position. As can be appreciated, when the drive mechanism 20 is activated, it causes simultaneous rotation of the first pivot link 120, the second pivot link 140, and the carrier frame 16 about axes A, B, C, and D, thereby allowing the translating mechanism 110 to smoothly rotate from the transport position toward the loading position.

Accordingly, the drive mechanism 20 has imparted the rotational force to the first pivot link 120 in a counterclockwise direction about axis A (as viewed from the left side of the apparatus), causing a distal end of the first pivot link 120 to rotate upward. The rotation of first pivot link 120, in turn, causes the carrier frame 16 to simultaneously translate upward and to rotate about axis C. Resultant and simultaneous to the translation of carrier frame 16, the second pivot link 140 is also translated upward and rotated relative to carrier frame 16 about axis D. Accordingly, the second pivot link 140 is also rotated in a counterclockwise direction about axis B.

In one aspect, a stabilizer link 22 may extend between and connect the first pivot link 120 and the second pivot link 140. The stabilizer link may provide a mechanism for imparting the rotational force generated by the drive mechanism 20 from the first pivot link 120 to the second pivot link 140 directly, which may facilitate translation of and may stabilize the translating mechanism 110.

Figure 6:
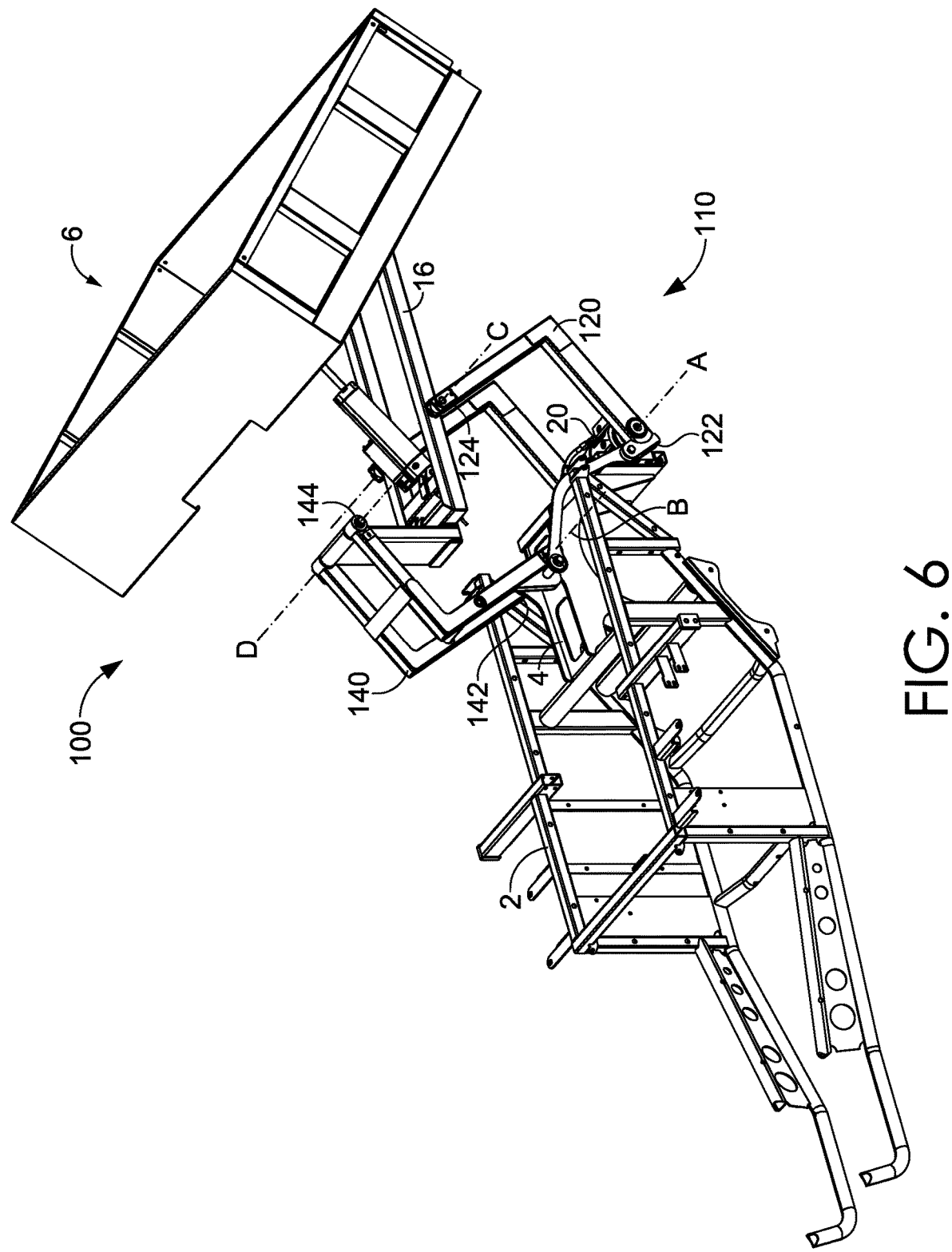
FIG. 6 depicts the utility vehicle frame having the translating cargo assembly affixed to the frame and in a second intermediate position, in accordance with aspects hereof.

FIG. 6 depicts the cargo frame 2 having the translating cargo assembly 100 affixed to the cargo frame 2 and in a second intermediate position, which depicts a continuation of the translation of the translating cargo assembly 100 toward the transport position. Accordingly, the second intermediate position depicts continued simultaneous rotation of the first pivot link 120, the second pivot link 140, and the carrier frame 16 about axes, A, B, C, and D.

Further, as shown here, the cargo bed 6 may remain in the tilted dumping position throughout the range of motion between the loading and transport positions. Further, the cargo bed 6 may be moved between the level cargo hauling position and the dumping position simultaneously with the translation of the cargo bed 6 and at any position within the range of motion of the translating mechanism 110.

Figure 7:
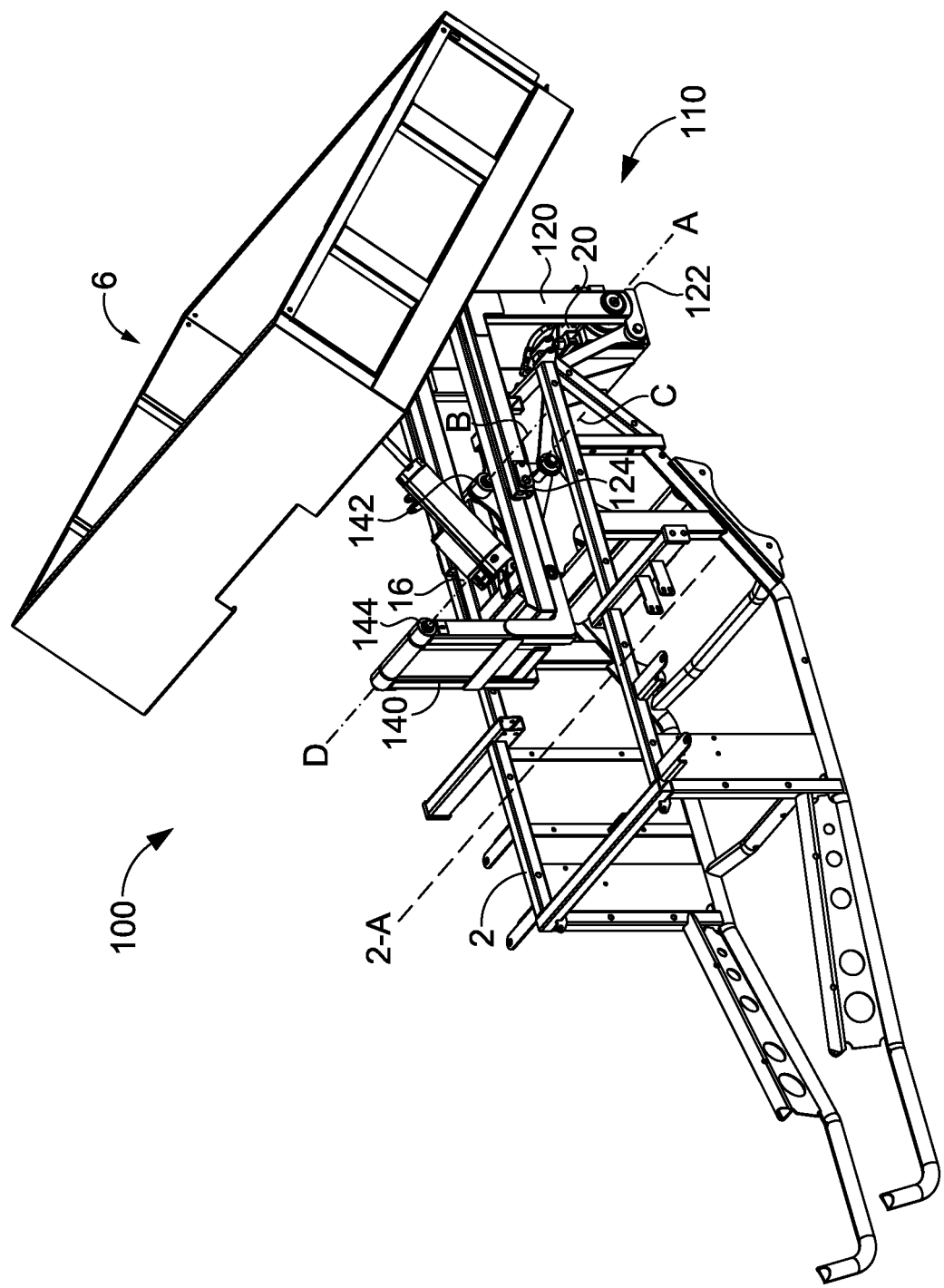
FIG. 7 depicts the utility vehicle frame having the translating cargo assembly affixed to the frame and in a transport position with the cargo bed raised, in accordance with aspects hereof.

FIG. 7 depicts the cargo frame 2 having the translating cargo assembly 100 affixed to the cargo frame 2 and in a transport position, with the cargo bed 6 in a dumping position in order to provide a view of the translating mechanism 110. When the cargo bed 6 is in the transport position, the translating mechanism 110 may be entirely or substantially above a horizontal plane 2-A, defined by an uppermost portion of the cargo frame 2.

Accordingly, the entire translating cargo assembly 100 may be included with, or added to, the vehicle without requiring any specialized configuration of the other components of the vehicle. For example, an engine and exhaust system, among many other types of components, may be positioned within the cargo frame 2 and at least partially beneath the cargo bed 6. The configuration of the translating mechanism 110 allows for the translating cargo assembly 100 to be mounted to a cargo frame 2 without requiring any customization or modifications to the other vehicle components positioned within the frame.

FIG. 8 depicts the cargo frame 2 having the translating cargo assembly 100 affixed to the cargo frame 2 and in a transport position. The cargo bed 6 may include a void 7 that receives the translating mechanism 110 when the translating cargo assembly 100 is in a transport position. As such, the cargo bed 6 may be adjacent to and supported by the cargo frame 2 when in the transport position.

Figure 9:
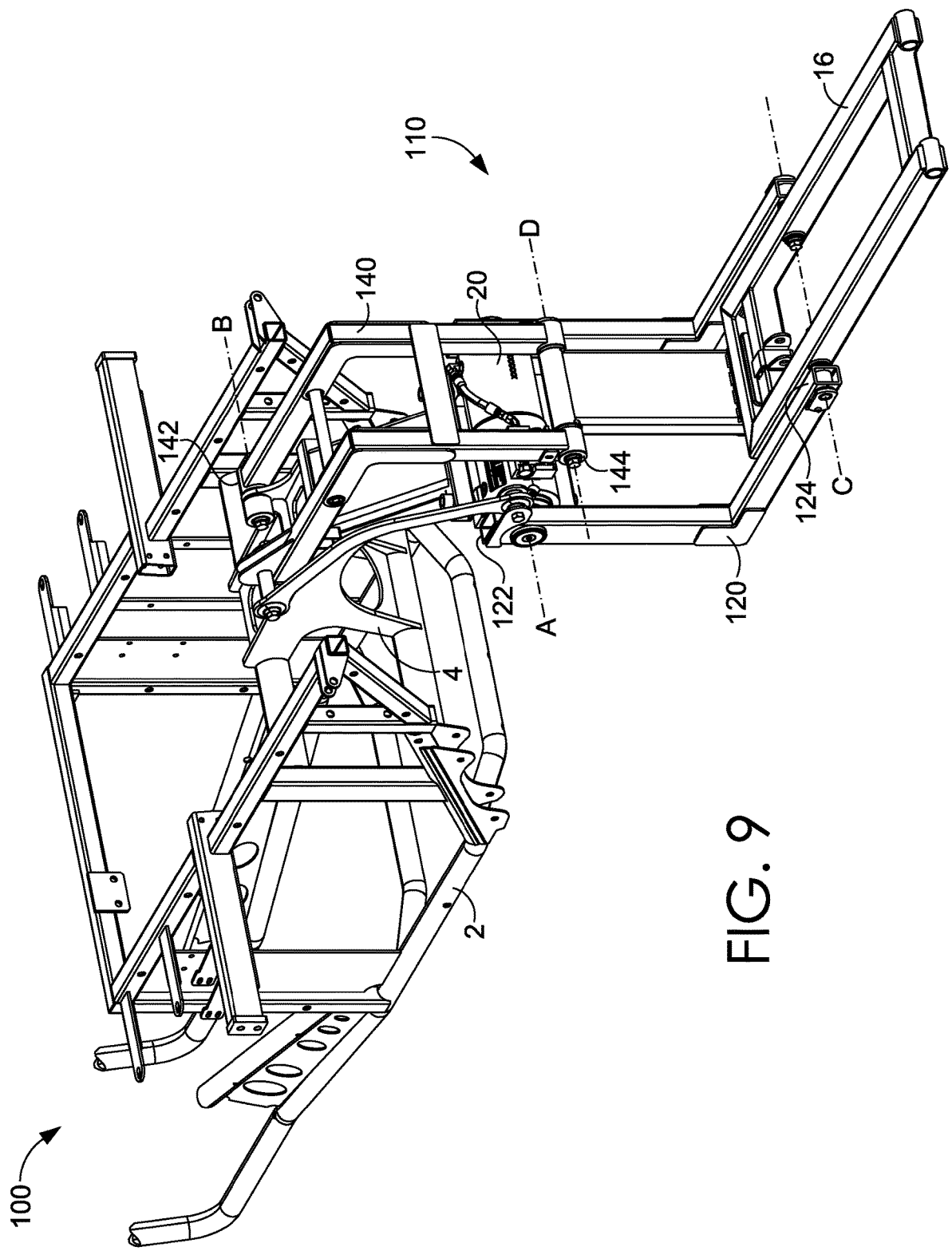
FIG. 9 depicts the utility vehicle frame having the translating cargo assembly affixed to the frame and in the loading position, from a rear-left, top-down perspective view, in accordance with aspects hereof.

FIG. 9 depicts the cargo frame 2 having the translating cargo assembly 100 affixed to the cargo frame 2 and in the loading position, from a rear-left top-down perspective view, in accordance with aspects hereof. In this aspect, the translating cargo assembly 100 is depicted without the cargo implement mated with the carrier frame 16. As can be appreciated, the various cargo implements described herein may be configured for attachment to the carrier frame 16. For example, the void of the cargo bed depicted in FIG. 8 (designated by reference numerals 7 and 6, respectively) may be sized to receive the carrier frame 16. Further, other cargo implements, such as the tank sprayer depicted in FIGS. 12b and 12c (designated by reference numeral 11) may be configured for slidable attachment with the carrier frame 16.

The carrier frame 16 may be rotatably coupled with the first pivot link 120, such that the carrier frame 16 fits within the width of the first pivot link 120, and within (at least in part) the width of the second pivot link 140. Accordingly, the space required for the translating mechanism 110 when in the transport position may be minimized. For example, the entire translating mechanism 110 may have a height equal to a height of the first pivot link 120, as measured, when in the transport position as depicted in FIG. 7.

Figure 10:
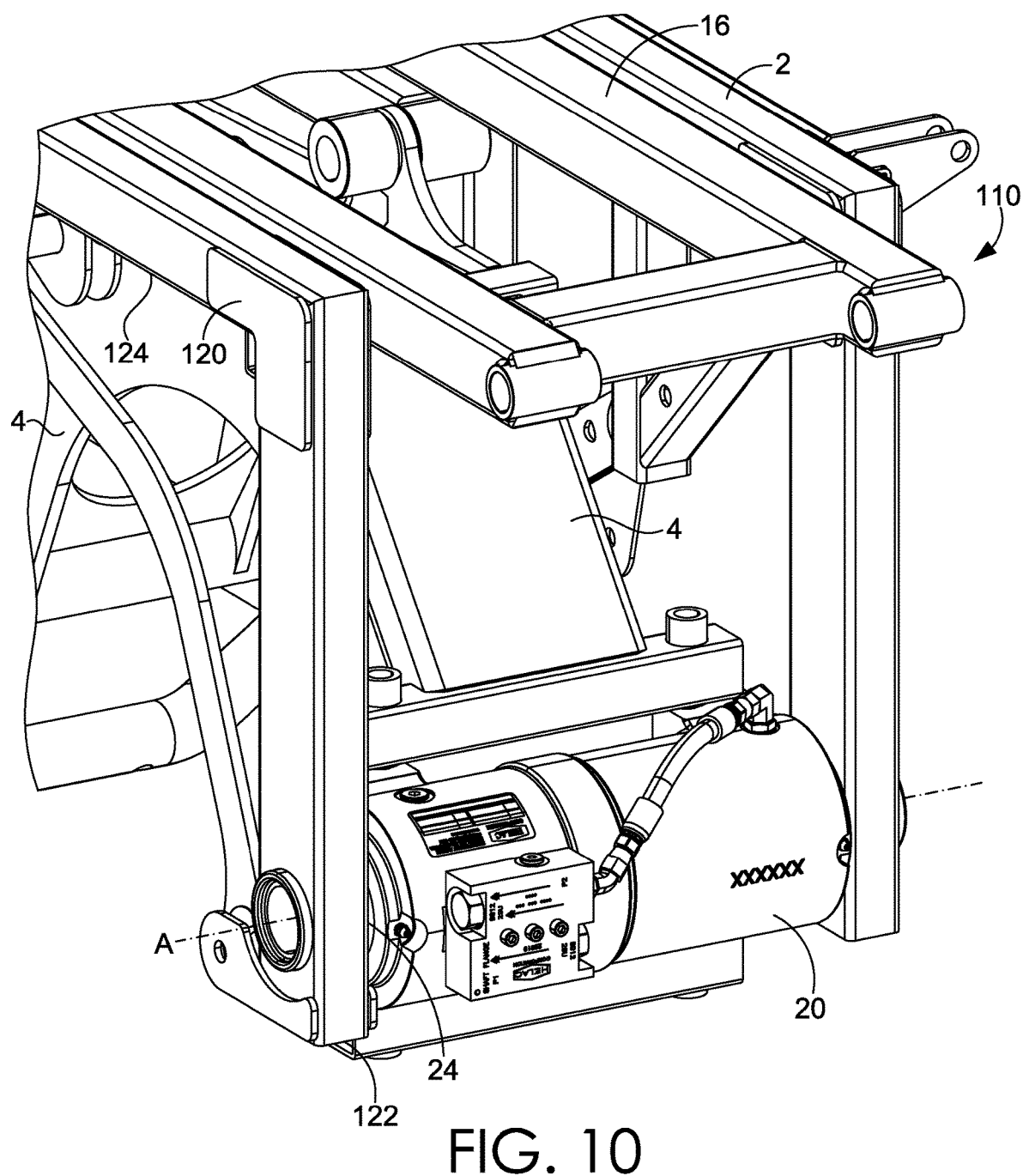
FIG. 10 depicts a close-up view of a drive mechanism of the translating cargo assembly depicted in FIG. 9.

Turning now to FIG. 10, a drive mechanism 20 may be affixed to mount 4 and operably coupled to the proximate end of first pivot link 120, about axis A. The drive mechanism 20 may include at least one output shaft 24 that provide a rotational force about a horizontal rotational axis, for example axis A, in clockwise or counterclockwise directions, for translating the cargo bed 6 through the range of positions. The proximate end of at least one member of the first pivot link 120 may be fixedly attached to the output shaft 24 of the drive mechanism 20, such that rotation of the output shaft 24 causes rotation of the first pivot link 120 about axis A. The drive mechanism 20 may be hydraulic, pneumatic, electric, or any other suitable type of drive mechanism 20. Further, in some aspects, the drive mechanism 20 may be replaced by any suitable drive mechanism for translating the translating mechanism 110. Accordingly, all other suitable drive mechanisms are considered within the scope of this disclosure.

Figure 11:
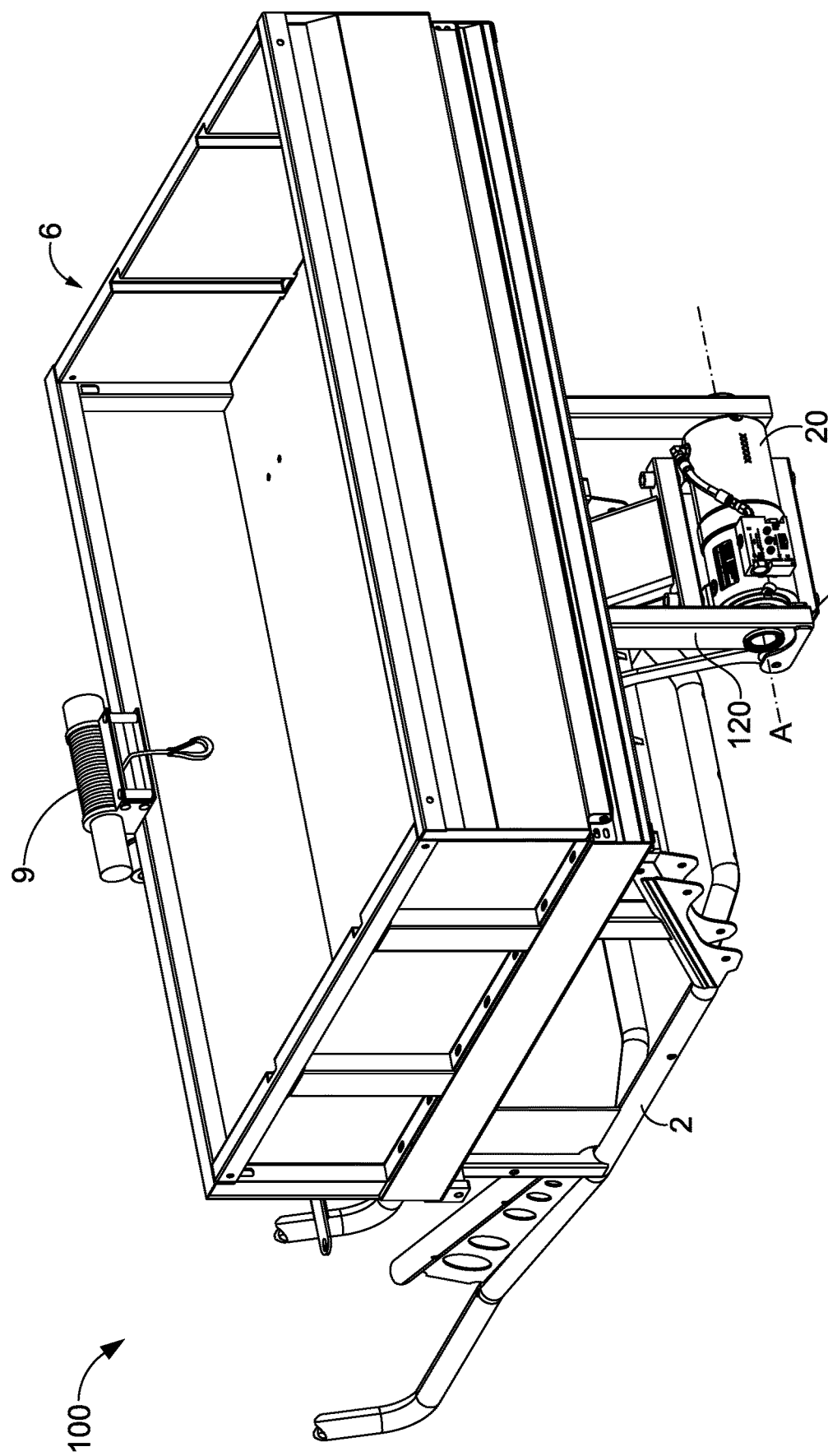
FIG. 11 depicts a cargo assembly having a cargo bed coupled therewith an a winch mounted to the cargo bed.

FIG. 11 depicts a translating cargo assembly 100 and that includes a cargo bed 6 having a winch 9, which may be used to help load heavy items, for example, when the cargo bed is in the loading position. The winch may be mounted to the cargo bed, or may be positioned at any other suitable location. For example, the winch may be mounted to the translation mechanism proximate axis D. Accordingly, when the cargo bed is placed on the ground for loading, the winch may be used to pull a load into the cargo bed. As can be appreciated, both the position of the cargo bed adjacent to the ground and use of a winch 9 may provide mechanical advantages for loading a load. For example, placing the cargo bed in substantially the same horizontal plane as the load creates an inclined plane that minimizes the force required to move the load. Additionally, providing the winch 9 at a location above the horizontal plane provides in additional advantage of providing force at an angle greater than horizontal, effectively creating an inclined plane that is advantaged toward the front and bottom of the cargo bed. However, it should be appreciated that the winch 9 or other accessory may be positioned at another location.

Figure 12A:
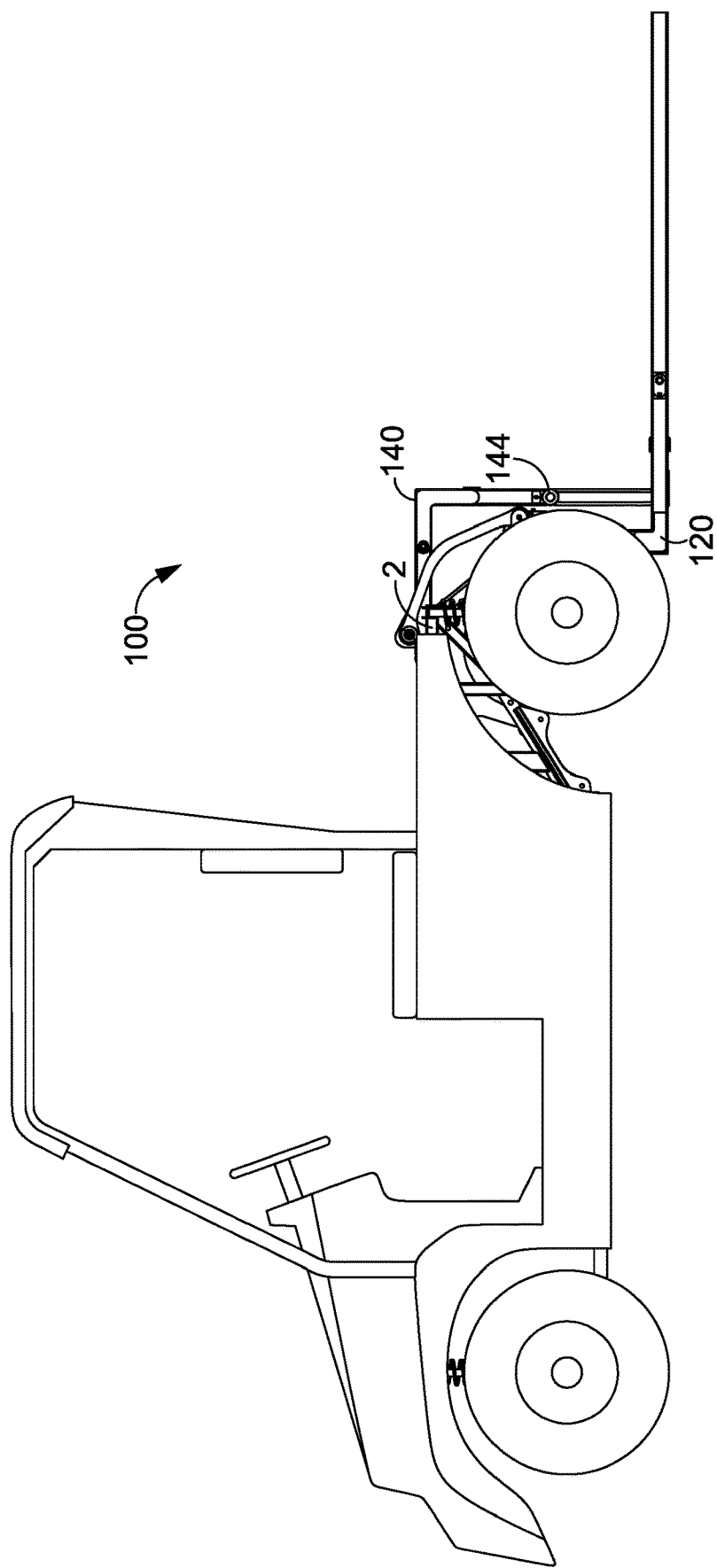
FIG. 12a depicts a side view of a vehicle having a translating cargo assembly in a loading position.
Figure 12B:
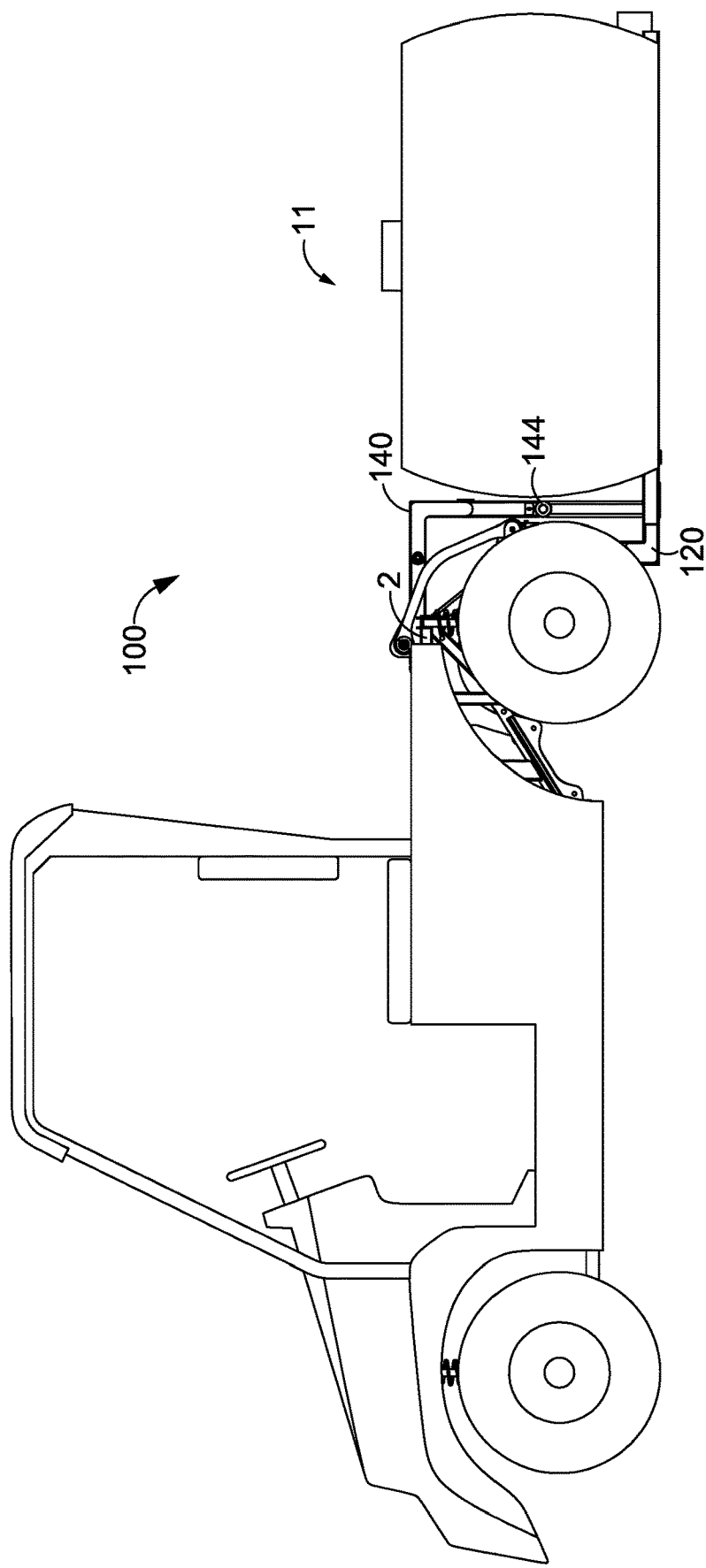
FIG. 12b depicts the vehicle of FIG. 12a having a tank sprayer implement attachment coupled with the translating cargo assembly.
Figure 12C:
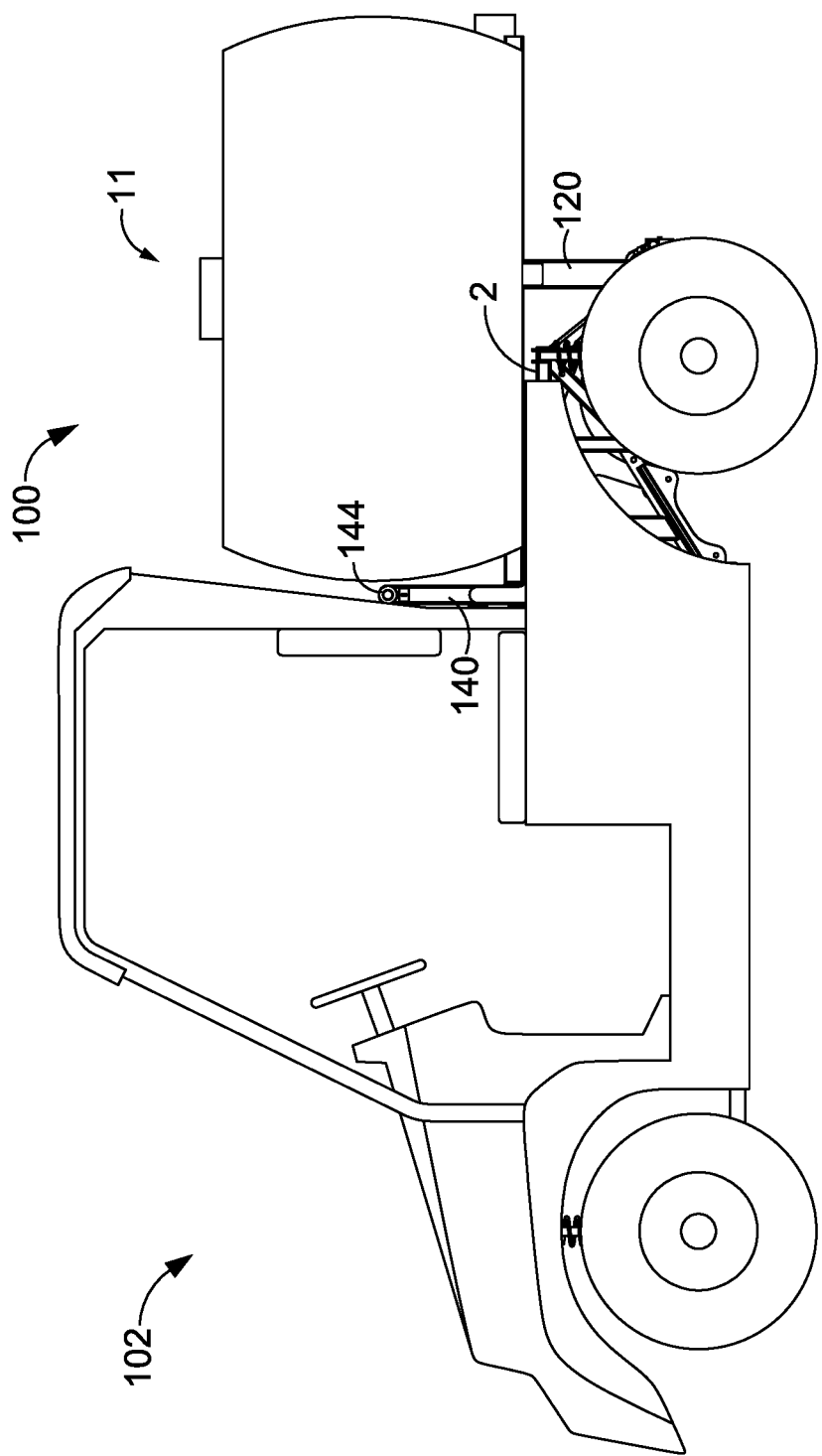
FIG. 12c depicts the vehicle of FIG. 12b having a tank sprayer implement attachment coupled with the translating cargo assembly in the transport position.

FIGS. 12a-12c depict another example of a cargo implement mated with the carrier frame 16. FIG. 12a depicts a side view of a vehicle having a translating cargo assembly 100 in a loading position. FIG. 12b depicts the vehicle of FIG. 12a having a tank sprayer 11 implement mated with the translating cargo assembly 100. FIG. 12c depicts the translating cargo assembly 100 with the tank sprayer 11 in a transport position. The various cargo implements discussed herein are not intended to be limiting. Rather, any suitable implement may be configured for use with the translating cargo assembly 100 and any such implements are considered within the scope of this disclosure. For example, a bail spike, log grappler, spreader, rake, plow, soil conditioner, forks, or bucket may be suitable implements that may be configured to mate with the carrier frame 16.

Turning now to a general discussion of the embodiments described hereinabove, a variety of additional features may be implemented with each of the embodiments. Additionally, some of the features described hereinabove may include variations, which may be applicable to each of the embodiments described herein. The translating cargo assembly 100 may be configured for use with any type of vehicle or cargo transporting apparatus. For example, the translating cargo assembly 100 may be mounted to an existing frame of a golf cart, or other turf vehicle. Continuing with this example, a mount, similar to the mount depicted in FIGS. 4-9, may be configured to attach to a frame of the golf cart. Accordingly, the remainder of the cargo assembly may be coupled with the mount and be positioned substantially or entirely external to the existing frame of the golf cart. As can be appreciated, such a configuration may be used with any suitable vehicle. In another aspect, the cargo assembly described herein may be implemented with or on a trailer. In this aspect, an entire cargo platform of the trailer, or a portion thereof, may include the cargo assembly. For example, a rearmost portion of a trailer for hauling landscaping or any other type of equipment may include a translating cargo assembly to aid in loading and unloading of items carried thereon.

As can be appreciated, the translating cargo assembly may be configured for use with any number of frame types. Accordingly, the translating cargo assembly may be retrofitted to a variety of platforms capable of carrying cargo. For instance, the translating cargo assembly may be configured to mount to an existing frame of a golf cart, or a terrain working vehicle. The mount depicted in the figures (designated by reference numeral 4) is illustrative in nature and is configured for use with an example frame. In some aspects, the translating mechanism may be directly coupled to the mount (as opposed to the frame). Resultantly, the mount may be customized such that the translating cargo assembly is usable with any number of vehicles. Further, in some aspects, the drive mechanism, such as a rotary actuator, is coupled with the mount, which allows for the entire translation mechanism to be external to the cargo frame.

Additionally, the relatively compact size of the example drive mechanism allows for a relatively compact translation mechanism, such that the space required to accommodate the translation mechanism is minimized. By way of comparison, a linear actuator must be long enough to provide an adequate stroke to translate the cargo assembly between the transport and loading positions. In contrast a more compact actuator, such as the rotary actuator depicted in FIG. 10, occupies the same amount of space, regardless of the position of the cargo assembly. Additionally, a linear actuator limits the range of translation of the cargo assembly because of the limitation of the stroke of the linear actuator. Conversely, a rotary actuator is not limited by stroke length. Further, utilizing a compact drive mechanism, such as a rotary actuator, decreases the weight of the cargo assembly as compared to other types of drive mechanism, such as a linear actuator.

In addition to the advantages described above, providing a cargo assembly as discussed herein enables the assembly to be incorporated with a vehicle frame that provides enhanced ground clearance behind the rear wheels. Additionally, although the positions of the various components of translating cargo assembly 100 have been described herein and depicted in the figures according to some aspects of this disclosure, the precise positions, locations, and structures of translating cargo assembly 100 may be modified. Such modifications or variations are considered within the scope of this disclosure.

With reference once again to FIGS. 1-9, in another aspect, the translating cargo assembly 100 may be implemented with a single pivot link. For example, suitable drive mechanisms may be implemented at both axes A and C, allowing for a single pivot link, in this case the first pivot link 120, to comprise the translating mechanism 110. As can be appreciated, drive mechanisms could also be positioned at axes B and D, in which case the second pivot link 140 could act as a single pivot link.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What may be claimed:

1. A translating cargo assembly, comprising:
    a cargo frame;
    a drive mechanism coupled to the cargo frame, the drive mechanism comprising a rotary actuator with an output shaft that provides a rotational force;
    a first pivot link having a first pivot link first end and a first pivot link second end, the first pivot link coupled to the output shaft at the first pivot link first end, the first pivot link pivotably coupled to a carrier frame at the first pivot link second end; and
    a second pivot link having a second pivot link first end and a second pivot link second end, the second pivot link pivotably coupled to the carrier frame at the second pivot link second end, the second pivot link pivotably coupled to the cargo frame at the second pivot link first end,
    a wherein the drive mechanism is effective to move the carrier frame between a transport position and a loading position.

2. The cargo assembly of claim 1, wherein the rotational force provided by the output shaft is about a first axis.

3. The cargo assembly of claim 2, wherein the first pivot link is fixedly attached to the output shaft of the rotary actuator, such that rotation of the output shaft causes rotation of the first pivot link about the first axis.

4. The cargo assembly of claim 3, further comprising a second rotational axis at the pivotable coupling of the second pivot link and the cargo frame, a third rotational axis at the coupling of the first pivot link to the carrier frame, and a fourth rotational axis at the coupling of the second pivot link to the carrier frame.

5. The cargo assembly of claim 4, wherein the rotation of the output shaft simultaneously rotates the cargo assembly about the first rotational axis, the second rotational axis, the third rotational axis, and the fourth rotational axis.

6. The cargo assembly of claim 5, wherein the rotation of the output shaft translates the cargo assembly between the transport position and the loading position.

7. The cargo assembly of claim 1, wherein the first pivot link, the carrier frame, and the second pivot link are positioned above a horizontal plane defined by the cargo frame when the cargo assembly is in the transport position.

8. The cargo assembly of claim 1, further comprising a cargo implement mated with the carrier frame.

9. The cargo assembly of claim 1, wherein the cargo frame is a portion of a frame of a utility task vehicle.

10. A translating cargo assembly, comprising:
    a rotary actuator coupled to a cargo frame; and
    a pivot link having a pivot link first end and a pivot link second end, the pivot link coupled to the rotary actuator at the pivot link first end, the pivot link pivotably coupled to a carrier frame at the pivot link second end,
    wherein the rotary actuator is effective to move the carrier frame between a transport position and a loading position.

11. The cargo assembly of claim 10, wherein the cargo frame is a portion of a frame of a utility task vehicle having a rear axle, wherein the rotary actuator includes an output shaft that extends transversely relative to the cargo frame rearward of the rear axle.

12. The cargo assembly of claim 10, wherein the cargo frame is a portion of a frame of a utility task vehicle having a rear axle, wherein the rotary actuator includes an output shaft that extends transversely relative to the cargo frame forward of the rear axle.

13. The cargo assembly of claim 10, further comprising a second rotary actuator coupled with the carrier frame and coupled with the pivot link second end.

14. A translating cargo assembly, comprising:
a mount coupled with a cargo frame;
a drive mechanism coupled to the mount, the drive mechanism comprising a rotary actuator with an output shaft that provides a rotational force;
a first pivot link having a first pivot link first end and a first pivot link second end, the first pivot link pivotably coupled to the output shaft at the first pivot link first end, the first pivot link pivotably coupled to a carrier frame at the first pivot link second end; and
a second pivot link having a second pivot link first end and a second pivot link second end, the second pivot link pivotably coupled to the carrier frame at the second pivot link second end, the second pivot link pivotably coupled to the mount at the second pivot link first end,
wherein the drive mechanism is effective to move the carrier frame between a transport position and a loading position.

15. The cargo assembly of claim 14, wherein the rotational force provided by the output shaft is about a first axis.

16. The cargo assembly of claim 14, further comprising a cargo implement mated with the carrier frame.

17. The cargo assembly of claim 16, wherein the cargo implement is a cargo bed.

18. The cargo assembly of claim 16, wherein the cargo implement is a tank sprayer.

19. The cargo assembly of claim 14, wherein the cargo frame is the frame of a vehicle.

* * * * *

UNITED STATES PATENT AND TRADEMARK OFFICE
CERTIFICATE OF CORRECTION

| | |
|---|---|
| PATENT NO. | : 10,640,030 B2 |
| APPLICATION NO. | : 15/675489 |
| DATED | : May 5, 2020 |
| INVENTOR(S) | : Harlan John Bartel et al. |

Page 1 of 1

It is certified that error appears in the above-identified patent and that said Letters Patent is hereby corrected as shown below:

On the Title Page

Column 2 item (74), (Attorney Agent, or Firm), Line 1: Delete "Schook," and insert -- Shook, --.

Signed and Sealed this
Twenty-third Day of June, 2020

Andrei Iancu
*Director of the United States Patent and Trademark Office*